United States Patent

[11] 3,604,339

| [72] | Inventors | Nicholas R. Beck;<br>Paul M. Denk, both of University City, Mo. |
|---|---|---|
| [21] | Appl. No. | 731,832 |
| [22] | Filed | May 24, 1968 |
| [45] | Patented | Sept. 14, 1971 |
| [73] | Assignee | Food Masters, Inc.<br>University City, Mo. |

[54] APPARATUS FOR MAKING FORMED COOKED MEAT
6 Claims, 10 Drawing Figs.

[52] U.S. Cl. .................................................. 99/349,
99/107, 99/174, 100/116, 100/219
[51] Int. Cl. ..................................................... A47j 27/20
[50] Field of Search ............................................ 100/219,
116, 240, 289, 238; 99/349, 350, 251, 107, 108,
174; 18/34 M; 17/32; 249/141, 155, 158, 160,
163, 165

[56] References Cited
UNITED STATES PATENTS

| 1,027,251 | 5/1912 | Hill | 99/349 |
| 2,048,447 | 7/1936 | Hewitt | 99/174 |
| 2,705,916 | 4/1955 | Millgard | 100/116 X |
| 2,818,797 | 1/1958 | Ballor | 100/289 X |
| 2,912,924 | 11/1959 | Dahl et al. | 100/219 |
| 3,017,822 | 1/1962 | Hawley | 100/240 |
| 3,039,136 | 6/1962 | Toepper et al. | 100/219 X |
| 3,233,281 | 2/1966 | Swift | 99/350 X |

*Primary Examiner*—Billy J. Wilhite
*Attorney*—Paul M. Denk

ABSTRACT: In an apparatus for making formed cooked meat rolls, loaves, or the like, a tubular member, being cylindrical or multisided, is lined with a thermal sensitive and heat shrinkable film, with the raw meat to be formed and cooked being inserted and compacted within said tubular member and liner. Closure members, such as end plates, are applied proximate the ends of the tubular member and contact the ends of the meat disposed therein so as to provide for the formation of the meat into the desired roll or loaf form, and various connecting means, such as threaded engagement, is provided for retaining the end plates positioned against the formed meat.

During the cooking process in which the tubular member combination and retained meat are exposed to a cooking medium, the heat shrinkable film closely adheres to the surface of the meat thereby preventing the natural juices of the meat from accumulating proximate this surface, and thereby forcing some juices, if any need to be discharged, to traverse longitudinally of the formed meat and seep past an end plate. The cooked and formed meat and the tightly conforming liner are then easily removed from the tubular member following the cooking process.

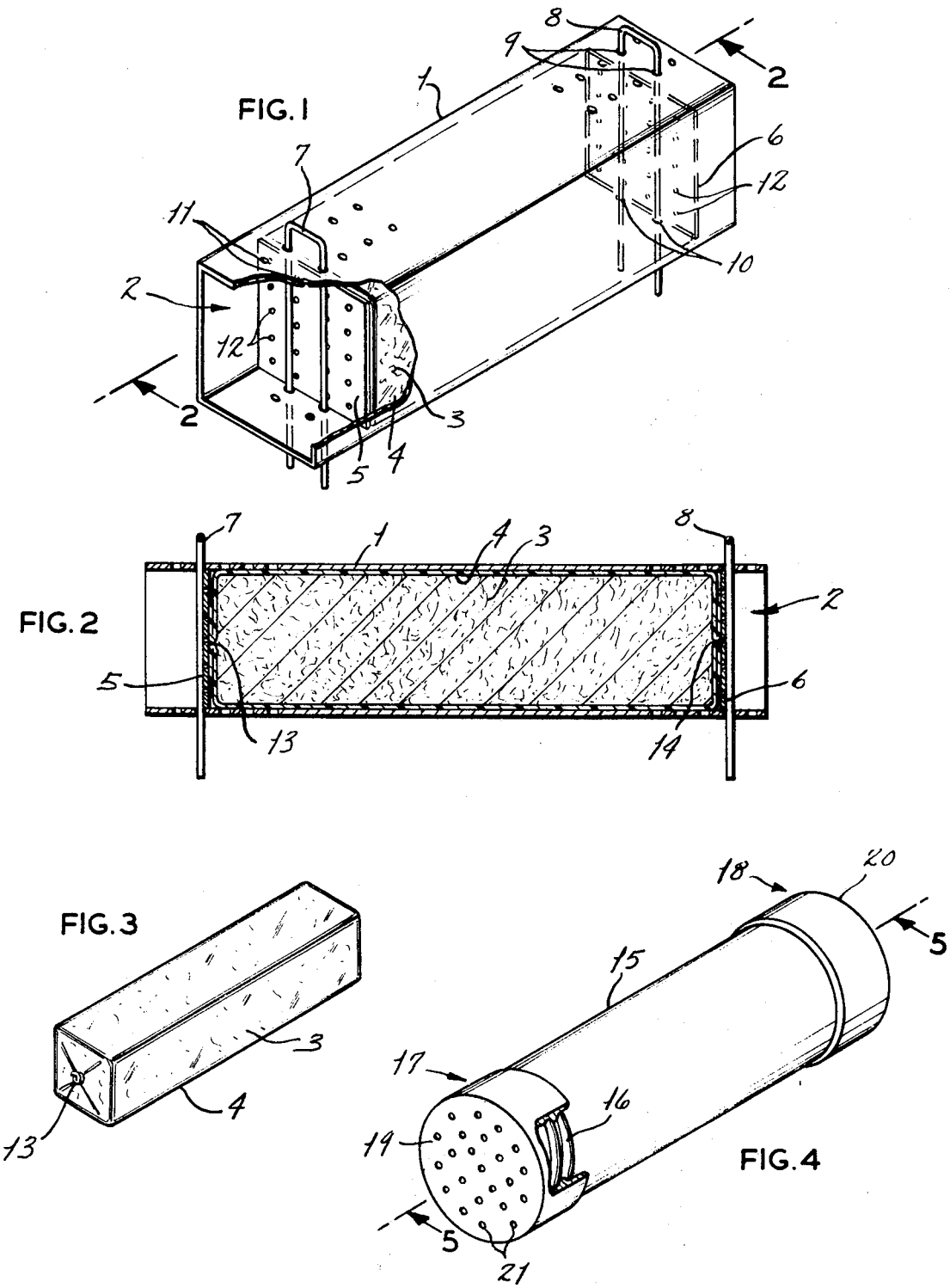

PATENTED SEP 14 1971  3,604,339

INVENTORS
NICHOLAS R. BECK
PAUL M. DENK

BY *Paul M. Denk*

ATTORNEY

PATENTED SEP 14 1971

INVENTORS
NICHOLAS R. BECK
PAUL M. DENK

BY *Paul M. Denk*

ATTORNEY

APPARATUS FOR MAKING FORMED COOKED MEAT

BACKGROUND OF THE INVENTION

This invention relates generally to a means for cooking foods, and more particularly, relates to an apparatus, for cooking compactly formed meat rolls, loaves, and the like.

Various devices have long been utilized for processing food rolls and loaves, and more specifically, rolls manufactured from scraps of meat and miscellaneous byproduct. The most apparent example of the foregoing are the common sausages which are packed ordinarily through the compacting of meat particles and scraps tightly within selected prepared and treated animal entrails. Of more recent origin, through, are the various forms of meat rolls that are prepared from the meats of small animals, such as poultry, which do not include a sufficient quantity or size of the anatomical parts for use in providing a casing for the processed rolls. As a result, processors have generally resorted to the use of some form of a synthetic casing for use in providing the casing and support for the various particles of meat, and the like, being packed into the roll, loaf, sausage, and related products. During the cooking process, a step which usually is preformed since the meat packed into the casing generally is still in the raw stage, these synthetic casings have not performed entirely satisfactory mainly because of the heat developed during the cooking cycle has a tendency to expand the film casing resulting in its generally becoming weakened and loosened as a covering for the cooked product contained therein. A very undesirable result from this loosening is the casing is that while the meat is cooking, its integral juices have a tendency to permeate to the surface of the product, and accumulate under the loosened casing. As a result, after the meat roll has been cooked, the ends of its casing must be opened again to allow for drainage of these juices, and the addition of a small amount of gelatine is added intermediate this casing and surface of the meat in order to provide for a gelatination and hardening of the surface of the meat roll, and to give it proper shape. Most of the meat rolls prepared under this prior art method prevalently exhibit a surface layer of gelatine throughout the product, which not only detracts from the taste of the meat, but also impairs its appearance.

Other prior art methods for preparing meat rolls or loaves include the usage of a fibrous casing into which the raw meat product, such as pieces of turkey meat, would be packed with the combination then being cooked either in a roasting oven or through immersion in a hot bath solution until the internal temperature of the meat reached a temperature considered sufficient to render it cooked. Many drawbacks are present in this process of cooking meat rolls and roasts, in that after the product has achieved cooking, the fibrous casing is then removed and discarded with the exposed meat then being repacked in a synthetic film to provide it with some coverage. Not only is it considered expensive to prepare formed meat in the foregoing manner, but also quality control and sanitary conditions cannot be properly maintained. A further detrimental result of preparing meat rolls and like in this manner becomes readily apparent in viewing the finished product, in that the shaping of the roll, and especially its two ends, is not satisfactorily achieved resulting in the roll ends being rather rounded in contours, and not providing or furnishing uniform or full-sized slices when the meat roll is cut. Frequently, the proximate end portions of the roll when sliced are just wasted.

An additional method for preparing meat roasts which is practiced in the prior art is to pack the raw meat into a fibrous casing, as aforesaid, and then pierce the entire casing surface so as to provide a plurality of perforations through which drainage of the meat juices during the cooking operation is effected. Frequently, the finished cooked product when prepared in this type of a casing exhibits burn spots at the location of the perforations, which detracts from product appearance. To rectify this problem the processors have encased the perforated fibrous casing and packed meat within a coating of impervious film or aluminum foil which prevents this discoloration during the roasting of the product. Then, after the meat achieves cooking, the particular foil or film is then removed along with the fibrous casing and thrown away, with the cooked meat roll then being repacked within another film casing. The consumption of labor and materials in preparing meat roasts in this manner are obviously excessive. In addition, cooking under this and the foregoing methods does not provide adequate quality and product portion control, resulting in considerable variation in both the length and weight of the formed and cooked meat.

It is an object of this invention to provide an apparatus for use in cooking meat rolls, loaves, roasts, or the like, which furnishes adequate control of the meat moisture during the cooking operation.

It is still a further object of this invention to provide an apparatus useful for preparing meats wherein through the cooperation of the various parts of the apparatus the meat is properly shaped prior to its being cooked, with the meat being molded during the cooking operation to retain this shape permanently.

It is yet an object of this invention to provide an apparatus for use in forming cooked meat rolls and loaves which may be easily handled and readied for use in a minimum of time thereby enhancing its efficiency when used.

Another object of this invention provides a reusable apparatus for preparing shaped meat rolls and the like, one that need not be discarded after each individual usage.

A further object of this invention is to provide an apparatus for forming and cooking meat rolls and roasts into a multitude of shapes and sizes.

Other objects will become apparent to those skilled in the art in the light of the following description and accompanying drawings.

SUMMARY OF THE INVENTION

This invention contemplates the usage of a form, shaping frame or molding member, such as for example, a length of tubular material, that may be either cylindrical or multisided in shape, the foregoing being lined before use with a liner of heat shrinkable film material. During the cooking of most meat compositions, and especially those meat rolls or loaves which have been pressed in the raw state into a compact mass, they exhibit a tendency during cooking to swell slightly or expand during the initial stages of the cooking process, and then as the product achieves a cooking temperature, eventually cease to expand, and in many instances, will even commence to shrink. Generally, the shrinking of any meat upon cooking is effected through a partial desiccation of its integral moisture and juices. And, in most instances, the meat juices are evaporated only after they have migrated to the surface of the particular meat product being cooked. This invention obviates this particular problem as present in the cooking of meat, primarily formed meat rolls, loaves, and the like, and achieves its correction through the usage of the thermal sensitive and heat shrinkable film which has a tendency to conform with the application of the cooking heat tightly to the external contours of the formed meat product being exposed to the heat. Therefore, although the prior art methods for cooking of meat rolls are fraught with the problem of accumulating moisture or juices proximate the surface of the roll during and subsequent to cooking, the usage of a heat shrinkable film in conjunction with the shaping or molding member of this invention results in the production of a cooked meat roll or loaf which retains a great percentage of its integral moisture throughout and following the cooking process, thereby providing a more flavorous and tasty finished product.

In the usage of this invention, a shaping frame, such as a pair of spaced apart plates, are used to mold a container of raw meat, with this container actually comprising a liner of heat shrinkable film, which not only retains the meat, but is also shaped along with the meat into a loaf form through the agency of the plates. In exposing this combination to the required amount of heat, the meat cooks to the shape it has been molded, and the liner contracts upon the meat, thereby confining its juices interiorly while imparting a casing to the molded cooked meat.

In the preferred embodiment of this invention, a tubular molding member having a liner located contiguously to its internal surfaces is filled to capacity and packed with raw meat, whether it be chicken, turkey, or other poultry meat parts, or any red meats, such as pieces of beef, pork, and the like, or even whole pieces of meat which can be stuffed into the molding member and adjacent liner to be cooked in the form of an integral meat roll. In the particular instance where the tubular molding member may be formed having openings at both ends, after the meat is stuffed therein, the heat shrinkable film is folded over at these ends so as to provide coverage proximate these portions of the raw meat roll sufficiently to prevent the discharge or release of any of the meat confined therein, but no so tightly in closure so as to prevent the escape of some of the excess meat juices that may accumulate proximate these ends during the cooking process. Subsequently, various forms of closure members, such as end plates, are applied to these ends of the tubular molding member and thereby compress the liner and the meat into conformity with the shape of the mold in which the raw meat is being retained. It should be readily apparent that where these end plates are flat in configuration, they will naturally force the ends of the meat roll to take and maintain a flat shape with respect to the longitudinal dimension of the roll. For this reason, after the meat roll is cooked, and has been removed from the tubular molding member, it can be sliced proximate both of its ends to provide as complete and full-sized slice as can be cut from the central portion of the cooked roll. In this manner, none of the roll is wasted or has to be discarded as a result of end slices being too small, such as is acquired when slicing the roundlike ends of present day sausages, rolls, or the like, prepared under the conventional methods.

During the cooking operation of formed meats wherein the teachings of this invention are employed, as the heat elevates the temperature of the molding member and meat, the latter, as previously described, initially exhibits a tendency to expand and compress with the liner against the inner surface of the molding member. Simultaneously, the heat shrinkable liner commences to contract in size and tightly conform upon the external surface of the formed meat, and eventually, after the meat ceases to swell, compacts the meat into a shape which assimilates the internal contours of the molding member, and occasionally, where the meat is packed at a lesser density, contracts enough to slightly loosen the meat from its tight retention within the molding member. Accordingly, and since the contracting function occurs during the latter stages of the cooking operation, after the meat has become fully cooked and the tubular molding member opened, the entire quantity of meat and its liner may be easily removed since it generally attains a loose tolerance fitting within the interior of said member. After the cooked meat and liner is removed from the molding member, the overlapping ends of the liner may be opened and quickly vacuumed so as to remove any amount of juices that may have accumulated thereat, with the ends then being once again completely overlapped and clipped thereby furnishing a cooked meat roll or loaf fully encased within a liner and ready for marketing and use. Since the portions of the liner overlapping the ends of the meat during the cooking operation were only loosely folded, any of the juices within the meat that attempted to migrate to its surfaces would eventually shift towards these ends and be partially discharged therefrom. This migration of the juices towards the ends of the meat is induced mainly through the unique feature of this invention of having the heat shrinkable film being contracted around the longitudinal surfaces of the formed meat during the cooking operation, thereby preventing the juices from accumulating along these surfaces intermediate the liner and the meat. Furthermore, since the juices are prevented from traversing to the meat surface, they are thereby generally retained within the same, and forced longitudinally towards the meat ends, with only a portion of the juices being discharged therefrom. Another feature of this invention is to provide a combination of end plates which, in function, not only allow for the discharge of the juices through perforations provided within one or more of said plates, but that said discharged juices are collected by another end plate which engages upon the same ends of the tubular molding member, thereby providing an enclosed spacing for accumulating juices intermediate the pair of cooperating end plates.

Thermal sensitive and heat shrinkable films are presently available for usage in combination with a molding member such as used in this invention, and most of said films are manufactured and produced as polymers, such as, polyethylene, polypropylene, copolymers of ethylene, or ethylene with acetylene, copolymers of ethylene including an olefin, and other polymers which exhibit improved shrink energy during exposure to heat and radiation. Other heat shrinkable films, for example, are polyvinylidene chloride and rubber hydrochloride. Many of the foregoing heat shrinkable films are marketed commercially under trademarks such as, Cryovac, Pliofilm, Saran, the extruded film of Alathon 14, to mention a few. Heat shrinkable films formed from the foregoing chemical compositions exhibit a tendency to provide both transverse and longitudinal shrinkage upon exposure to any elevation in temperature. For example, when most of the foregoing films are subjected to temperatures around 200° F., the films have been found to shrink by as much as 40 percent from their preexposed condition. In addition, they exhibit strong tensile strength even during and subsequent to exposure to heat. Generally, in performing the cooking operation of this invention with the combination of tubular molding member and heat shrinkable film having the compacted meat therein, the combination is normally subjected to the heat of a semi or dry heat oven, a smoking oven, or as is the usual practice, simply to immerse the entire combination into a hot bath until the internal temperature of the meat product achieves that range considered sufficient to provide a cooked product as established by government regulations. The quantity of heat normally employed during the standard cooking operations is sufficient to induce shrinkage of the foregoing films, and at least adequate shrinkage to achieve the purposes and desired results of this invention. Another feature which is beneficial and achieved through the use of this invention is that most of the aforementioned heat shrinkable films may be printed before usage, and retain said printing during and subsequent to their exposure to a cooking operation. As a result, the end product removed from the tubular molding member after being cooked is a complete and commercially ready product.

BRIEF DESCRIPTION OF THE DRAWINGS

In the drawings, FIG. 1 is a perspective view of a drawings, molding member of this invention, with a portion of said member being removed to disclose an end plate;

FIG. 2 is a longitudinal sectional view taken along the line 2—2 of the tubular molding member revealed in FIG. 1, also showing the impacted meat being retained by the heat shrinkable liner;

FIG. 3 is a perspective view of the cooked formed meat as enclosed within the liner after being removed from the tubular molding member of FIG. 1, subsequent to the cooking operation;

FIG. 4 is a perspective view of a modified tubular molding member having end closure means connecting therewith;

DESCRIPTION OF THE PREFERRED EMBODIMENT

Figure 5:
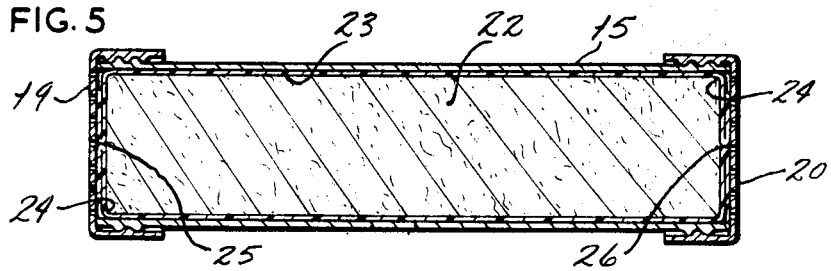
FIG. 5 is a longitudinal sectional view of the tubular molding member taken along the line 5—5 of FIG. 4.

Referring now to the drawings for an illustrative embodiment of the tubular molding member of this invention, in FIG. 1, reference numeral 1 generally depicts the tubular molding member, in this instance being of a multisided configuration and square or rectangular in cross section, with said molding member having a central opening 2 provided therethrough. This opening through the molding member provides the cavity in which the raw meat, generally depicted at 3, is compacted within the liner 4 which is formed from a thermal sensitive and heat shrinkable film composition. Providing the end closure for the mold cavity formed within the central opening 2 of the tubular member are a pair of end plates 5 and 6 which are constructed to dimensions which allow for their close tolerance insertion within the tubular member, with the plate edges having sufficient contiguity with the inner surfaces of the tubular member so as to prevent the escape of any of the raw meat product confined therein. To furnish a snug retention of the plates in tight contact with the ends of the meat roll, a pair of rodlike members 7 and 8, herein shown being inverted U-shaped in formation, insert through a series of aligned apertures 9 and 10 provided through the sides of the tubular member 1. The length of the meat rolls being formed and cooked within the tubular molding member may vary in length, and to allow for this variation the rodlike members 7 and 8 may also project through the other sets of aligned apertures 11, provided proximate each end of the tubular member, such as when an increase in the length of the roll is necessitated through impaction of a greater quantity of the raw meat 3 into the tubular molding member in preparation for the cooking operation. It is to be noted that the closure means 5 and 6 contain a series of perforations, as at 12, which are useful during the cooking process to allow for the escape of the meat juices and moisture while precluding passage of any particles of meat contained therein.

By referring to FIG. 2, it can be seen that the liner 4 of heat shrinkable film and the meat 3 contained within the tubular molding member 1 generally conform to the internal contours of the cavity formed within the central opening 2 of said molding member. After the meat has been deposited within the tubular molding member and a contiguous liner, the ends of the liner are slightly folded over, as at 13 and 14, after which the end plates 5 and 6 are inserted into contact with the ends of the meat roll and liner and compressed thereagainst so as to induce the meat and liner to conform to the desired shape as aforesaid. After the roll has been formed through the function of these end plates, the rodlike members 7 and 8 are inserted through those pairs of aligned apertures which provide for a tight retention of said end plates against the proximate ends of the meat roll.

After the meat roll has been thoroughly cooked to that internal temperature considered sufficient to achieve cooking, the entire meat roll and its bound liner may be thereafter easily removed since the liner usually has shrunk sufficiently to impart only a loose tolerance fitting of the cooked roll within the tubular member 1. After removal of this cooked roll from the tubular member the ends of the liner, such as disclosed at 13, may be once again slightly opened and vacuumed so as to remove any meat juices that may have accumulated at this vicinity, with said ends once again being folded and clipped to provide a complete enclosure for the formed cooked meat roll contained therein. See FIG. 3. In this arrangement, the cooked meat roll is a complete commercial product ready for marketing.

Figure 6:
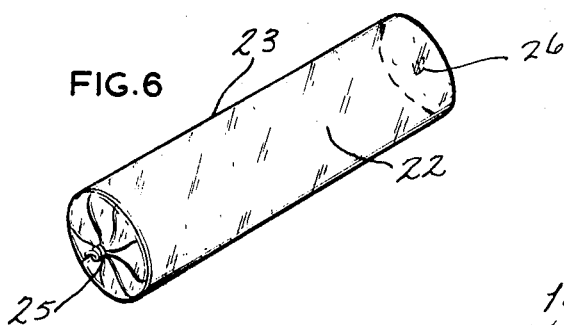
FIG 6 is a perspective view of the meat roll formed in the tubular member disclosed in FIG. 4, further showing the heat shrinkable liner being folded and clipped at one end of said roll.

A modification in the cooking apparatus of this invention is disclosed in FIG. 4, wherein the tubular member 15 is herein disclosed as being cylindrical in formation, and formed having large pitch threads, as at 16, at both its ends 17 and 18 so as to accommodate the closure means, herein comprising the end plates 19 and 20, which may be manually secured thereto. Although the means for mounting the end plates upon the tubular member are herein described as threaded connections, other standard methods for connecting these end plates to the tubular member may be used. At least one of the end plates is herein shown containing a series of perforations 21 so as to allow for, as previously described, the passage of the meat juices during the cooking operation while simultaneously preventing release of any of the meat particles. By referring to FIG. 5, it can be seen that after compaction of the raw meat 22 within the tubular member 15, the heat shrinkable liner 23 closely conforms to the internal contours of said tubular member. In this manner, even the corners of the meat roll, for example as disclosed at 24, closely conform with both the internal surfaces of the tubular member 15 and the end plates 19 and 20 so as to provide, after cooking, a well formed meat roll that upon slicing furnishes properly dimensioned slices of meat even when initially cut from the ends. Also, the liner 23 of this invention is disclosed as being loosely folded over, as at 25 and 26, proximate these end portions of the roll, and during the cooking operation permits the release of the juices therefrom and through the perforations 21 contained in at least one of the end plates 19, but prevents the loss of any of the meat particles. A perspective view of the cooked meat roll formed within the tubular molding member 15 is disclosed in FIG. 6, after being removed from the mold following performance of the cooking step. The cooked meat roll 22 and its liner 23 have taken on the form of the molding member cavity, thereby providing a uniformly dimensioned formed meat roll. The folded ends 25 and 26 of the liner, immediately after the cooking operation and when the roll has been removed from the tubular molding member, may be opened to remove any remaining juices, and then immediately refolded and clipped thereby furnishing total coverage and a complete casing for the cooked meat roll.

Figure 7:
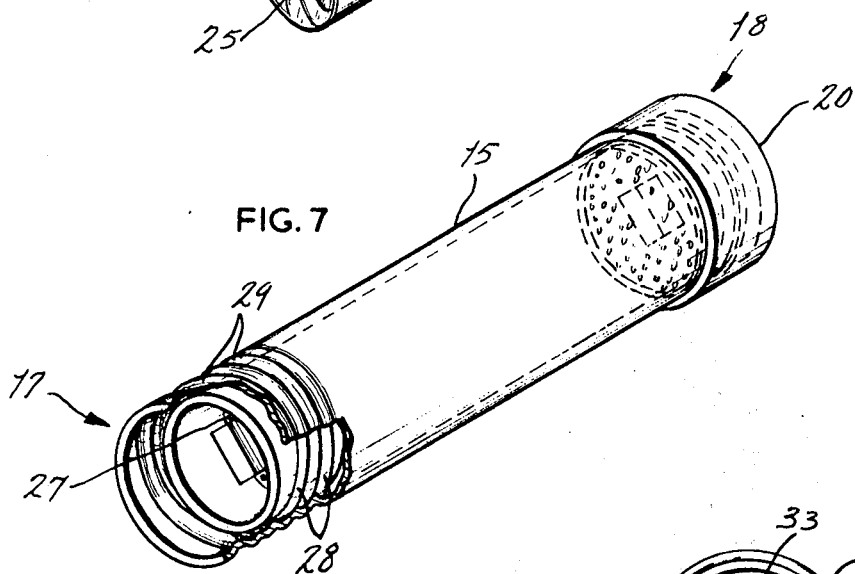
FIG. 7 is a perspective view of a tubular molding member with a portion of said tube being removed to reveal a modification in an end closure means which inserts within said tube.
Figure 9:
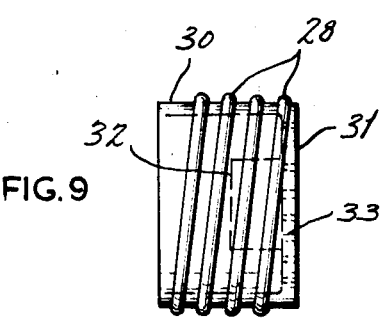
FIG. 9 is a side view of the closure means shown in FIG. 8.
Figure 8:
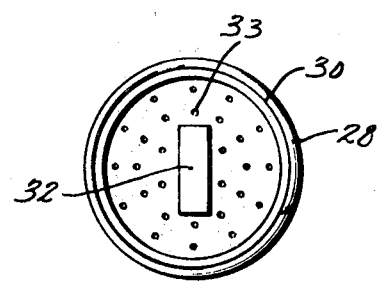
FIG. 8 is an end view of the closure means that inserts within the tubular molding member disclosed in FIG. 7.

The tubular molding member 15, also revealed in FIG. 7, is shown containing a modified form of closure member or end plate 27, upon at least one its ends, as at 17. The molding member may utilize either a perforated or unperforated end plate 20 upon its opposite end 18, as previously described, but the end plate 27 is constructed having an overall diameter slightly less than the internal diameter of the tubular member thereby allowing for its insertion, as through engagement of its threads 28 with the threads 29 formed near the end of the tubular member, so that the end plate 27 may be inserted deeply within the tubular member and therein act to compress the raw meat to conform with the internal contours of said member. This end plate 27, as further shown in FIGS. 8 and 9, is constructed having a threaded sleevelike portion 30 which is formed integrally with its surface plate 31 and which abuts against the enclosed meat to shape it during the molding and cooking operations. The sleevelike member 30 has the series of threads 28 which are useful for engaging with the threads 29 of the tubular molding member to achieve the foregoing. In addition, so as to facilitate the twisting insertion or removal of this closure 27, the surface plate 31 has an externally projecting handle 32 extending from its back side, which may be easily grasped to effect turning. Furthermore, where it is desired to collect the meat juices exuding from the ends of the meat roll during the cooking operation, the surface plate 31 may contain a series of perforations, such as 33, which allows for passage of the meat moisture or juices therethrough, but prevents the release of any of the particles of meat. It is further within the contemplation of this invention that where one wants to collect the meat juices for use as a natural gravy with the cooked meat, a closure member, such as the end plate 19, previously revealed in FIGS. 4 and 5, may be applied externally upon the end 17 of the tubular molding member 15 which has already received the member 27. In this particular combination, the type of closure member 19 used will not contain any perforations, and therefore, any meat juices traversing through the perforations contained in the closure plate 27 will be collected within the cavity formed intermediate said plate 27 and the member 19. After a cooking operation, the closure 19 may be removed and the juices contained therein collected and preserved.

Figure 10:
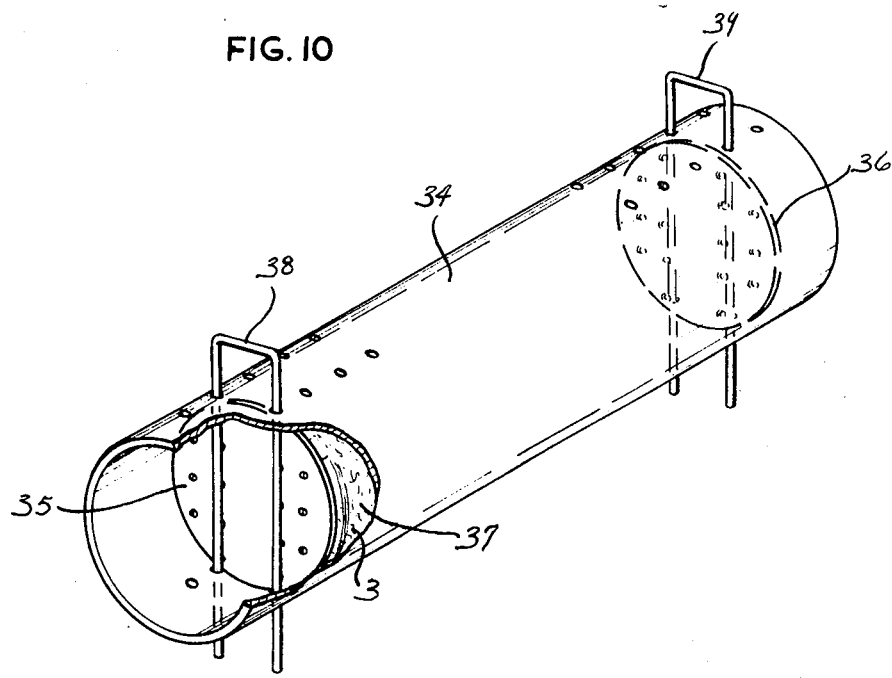
FIG. 10 is a perspective view of a cylindrical tubular molding member, with a portion of said member being removed to disclose and end plate.

FIG. 10 discloses a cylindrical molding member 34 incorporating perforated end plates 35 and 36 for acting in conjunction with the heat shrinkable liner 37 for retaining the meat 3. A pair of rodlike members 38 and 39 retain said end plates 35 and 36 contiguous with the retained meat.

In the method of employing this apparatus for making meat rolls and the like, although generally hereinbefore described, the procedures may be more accurately understood through review of the following example: The tubular molding member 15, as revealed in FIG. 7, was internally lined with a cylindrical liner formed of heat shrinkable film. Then the end of the liner proximate the tube end 18 was folded over and the end plate 20 fitted upon this end of the tubular member. Raw pieces of meat, comprising pieces of raw turkey flesh, were deposited within the liner and tubular member through the opposite open end of the liner until it appeared that the entire cavity of the tubular member was completely filled and packed with this raw meat. Thereafter, the remaining open end of the liner was loosely folded over so as to provide a liner which would prevent the exit of pieces of meat, but to the contrary, would not prevent the passage of the meat juices. Following this, the end plate 27 was inserted within the end 17 of the tubular member, pressed against the liner and meat contained therein, and upon achieving a threaded connection was turned, under force, against the contents of the tube thereby exerting a pressure upon said raw meat. Thereafter, an end plate, such as plate 19, was turned externally upon the same end of the tubular member. Following this preparation the entire tubular member with its raw meat contained therein was ready for cooking. A hot bath solution of water was elevated to and maintained at a temperature of approximately 175° F., and the entire tubular member combination was inserted within this hot water bath for approximately 35 minutes at which time the internal temperature of the meat was estimated to have reached a temperature of approximately 162° F. While the temperature of the meat was gradually rising, it was determined that the turkey meat expanded approximately 10 percent in volume thereby forcing it along with the liner into firm contact with the inner surface of the tubular member and its attaching end plates. At this time the meat roll was determined to be even further compacting to the inner contours of the mold, with its ends being substantially flattened. Additionally, the heat shrinkable film surrounding the roll contracted upon its surface thereby furnishing a tightened and smooth encasement. Since the entire tubular molding member was standing upon the end 17 containing the end plate 19 and closure means 27, and further since the juices of the turkey meat were prevented from permeating to its surface by means of the film, the juices gradually migrated to and through the perforated plate 31 and thereafter retained within the cavity intermediate it and the end plate 19. Since the end plate 19 used in this test contained no perforations, no juices passed thereby. Upon the internal temperature of the meat product achieving a temperature of approximately 162° F., the entire tubular member and meat assembly were removed from this hot water bath and immediately submerged within a hot water bath maintained at a temperature of approximately 200°. Through this action the heat shrinkable film was further contracted to provide a tighter encasement around the meat roll, but due to the shortness of time during which the combination was submerged in this latter bath, no further cooking of the meat of any significance was acquired. After the tubular member remained in this water of higher temperature for a period of time less than 60 seconds, it was removed and allowed to set for approximately 2 minutes. Thereafter, both the end plate 19 and the member 27 were carefully removed, the opposite end plate 20 also being removed, and the meat juices collected. Thereafter, by exerting a drawing force upon one folded end of the liner, the entire meat roll was slid from the tubular member. The ends of the liner were unfolded, any remaining juices were vacuumed away, and the liner ends once again folded and clipped furnishing a complete, fully cooked and well formed meat roll.

Other variations in the construction of this apparatus for making the meat rolls and loaves of this invention may be thought of by those skilled in the art in the light of the foregoing disclosure, but such variations are intended to be included within the scope of the appended claims. For example, it is within the contemplation of this invention that any form of molding members or plate which will provide for the contoured formation of a meat roll or loaf that may be simultaneously enclosed and used in conjunction with a thermally shrinkable film are intended to be encompassed in these patent claims. These are merely illustrative.

1. An apparatus for forming a cooked meat roll while allowing discharge of meat juices therefrom comprising a meat shaping frame having a central cavity provided therethrough, a confining liner of thermal sensitive and heat shrinkable film disposed contiguously with and confirming to the inner contours of the said meat shaping frame, said shaping frame and liner being receptive to the meat to be formed and cooked therein, end plates provided for close fitting within the central cavity of each end of said shaping frame, each plate being forced against the proximate end of the meat disposed within said frame to shape the ends of said meat roll, each end plate having a series of perforations to allow for discharge of the juices during contraction of the heat shrinkable liner around the meat roll during its cooking thereof.

2. The invention of claim 1 wherein said meat shaping frame is provided with a series of aligned apertures proximate each of its ends, retaining rods provided for insertion through aligned apertures proximate each end to provide for snug retention of the end plates against the shaped meat disposed therebetween, each rod capable of disposition within one or more of the aligned apertures to provide for readjustment in its retention of the end plate contiguously against an end of the shaped meat.

3. The invention of claim 1 wherein each of said end plates threadedly engages within an end of said meat shaping frame, each end plate capable of being turned to provide for adjustment of its disposition within an end of said meat shaping frame to provide for its snug retention against the contiguous shaped meat.

4. The invention of claim 3 wherein a handle means connects with each end plate as threadedly engaged within an end of said meat shaping frame to facilitate its adjustment therein, a second end plate threadedly engaging to each end of said meat shaping frame to thereby form a cavity intermediate each pair of end plates threadedly engaging to each end of said meat shaping frame, the discharging meat juices acquiring disposition within each said formed cavity to provide for their collection and retention therein during the cooking operation.

5. The invention of claim 1 wherein the meat shaping frame is formed as a multisided member.

6. The invention of claim 1 wherein the meat shaping frame is formed as a cylindrical member.

UNITED STATES PATENT OFFICE
CERTIFICATE OF CORRECTION

Patent No. 3,604,339　　　　　　　　　　Dated　September 14, 1971

Inventor(s)　Nicholas R. Beck, et al.

It is certified that error appears in the above-identified patent and that said Letters Patent are hereby corrected as shown below:

Column 4, line 56, "drawings,", second occurrence, should read -- multi-sided tubular --. Column 8, line 31, "confirming" should read -- conforming --; line 48, "of the end plate" should read -- of the proximate end plate --.

Signed and sealed this 10th day of October 1972.

(SEAL)
Attest:

EDWARD M. FLETCHER, JR.　　　　　　　ROBERT GOTTSCHALK
Attesting Officer　　　　　　　　　　　Commissioner of Patents